July 17, 1951
J. A. PASK ET AL
2,560,593
METHOD OF MAKING A GLASS-TO-METAL SEAL
Filed May 4, 1945
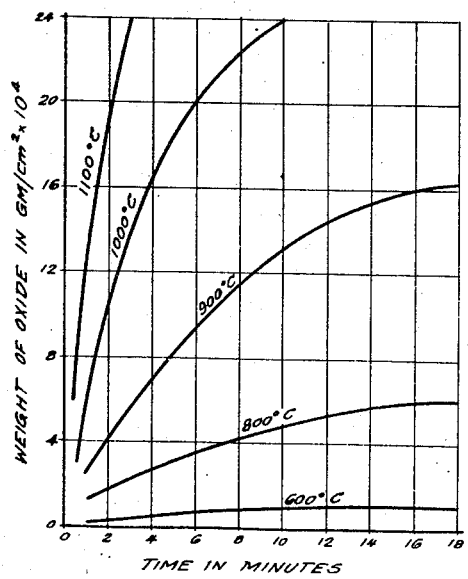
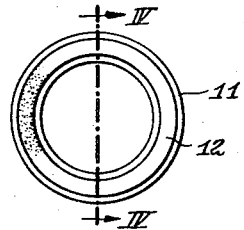
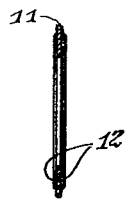
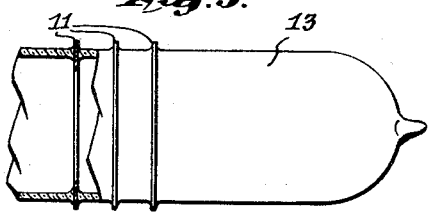
INVENTORS
J. A. PASK
J. E. SCHIVEREE
BY *Greenhowe*
ATTORNEY Patented July 17, 1951

2,560,593

UNITED STATES PATENT OFFICE 2,560,593

METHOD OF MAKING A GLASS-TO-METAL SEAL

Joseph A. Pask and John E. Schiveree, Bloomfield, N. J., assignors to Westinghouse Electric Corporation, East Pittsburgh, Pa., a corporation of Pennsylvania Application May 4, 1945, Serial No. 591,998

2 Claims. (Cl. 49—81)

This invention relates to sealing glass to metal, and particularly to parts formed of a nickel-cobalt-iron alloy, identified in the Lempert et al. Patent No. 2,279,831, dated April 14, 1942, where it is designated "Kovar."

The principal object of our invention, generally considered, is to seal glass to metal, avoiding non-vacuum-tight joints due to over oxidation of the metal, as by coating the metal, which may be the nickel-cobalt-iron alloy above identified, alloys of iron and nickel, tungsten, copper, nickel, or the like, the surfaces of which are to be sealed, with a thin protective glass layer prior to the normal seal working.

Another object of our invention is to prepare the glass for coating metal, prior to making the desired seal, by grinding said glass to powder and suspending in a liquid, such as water or alcohol, said liquid preferably containing some electrolyte, such as a small proportion of lithium nitrate, if alcohol is used as the liquid, as well as possibly containing clay or organic binder, in order to provide a film of unfired glass with sufficient strength for handling.

A still further object of our invention is to prepare the metal, prior to application of the glass coating, with the surface to be coated of controlled roughness, as by baking in a hydrogen atmosphere to clean, and then roughening by controlled preoxidation, sand blasting, or chemical treatment, whereby after the glass suspension is applied, heating causes the glass particles to fuse over on the surface.

Other objects and advantages of the invention will become apparent as the description proceeds.

Referring to the drawing:

Fig. 1 is a flow diagram showing; first, how the glass is prepared; second, how the metal is prepared; and third, how the glass preparation is applied to the prepared metal;

Fig. 2 is a graph showing typical or average rates of oxidation of sheets of the nickel-cobalt-iron alloy, previously identified, of small sizes which have been used, at various temperatures;

Fig. 3 is an elevational view of a ring of the nickel-cobalt-iron alloy previously identified partly coated with glass in accordance with our invention;

Fig. 4 is a transverse sectional view on the line IV—IV of Fig. 3 in the direction of the arrows; and Fig. 5 is a portion of a vacuum tube incorporating rings such as illustrated in Figs. 3 and 4.

We propose glass enameling or powder glassing as a new step in making glass-to-metal seals. In accordance with our invention we roughen the metal, either by preoxidation, sand blasting, or chemical treatment, it being understood that sand blasting and chemical treatment may also be combined, the former serving as an initial cleaning step, after which an enamel-like layer of a sealing glass may be applied.

The next or normal step of sealing a glass part to a metal part simply resolves itself into sealing glass to glass in accordance with the usual rules, during which procedure the interface conditions established during the glass enameling remain substantially fixed. Such glass enameling methods lend themselves to mass production, since all roughening treatment and fusing of glass coatings are carried out in controlled, preferably electrically-heated, ovens that can be of the continuous type. All of such seals may be made uniform because the human element is eliminated.

In connecting glass to, for example an article of a nickel-cobalt-iron alloy, such as previously identified, the latter is desirably enameled with a glass, positively identified as Corning No. 7052, or other glass having approximately the same coefficient of expansion as the alloy. Corning Glass No. 7052 is a potash-barium-borosilicate glass sold under the trade-mark "Pyrex," laboratory No. G-705-FN, for sealing purposes. It has a softening point at 708±5° C., an annealing point at 480° C., a strain point at 442° C., a coefficient of expansion of $46 \pm 1.5 \times 10^{-7}$ between 0 and 300° C., a working point at approximately 1115° C. and a density of 2.29. The $\log_{10}$ of its resistivity at 350° C. is 7.40. Its power factor is .0026 (expressed as a decimal—not as per cent), its dielectric constant 5.1, and its loss factor .0133 (expressed as a decimal—not as per cent). The nickel-cobalt-iron alloy referred to has been developed to have a coefficient of expansion approximating that of glass, such as that above identified, suitable for use in making vacuum devices. It is merely illustrative of metal to which glass may be sealed in accordance with our invention. In so doing, it is found that the adherence to the alloy, roughened by oxide, was dependent on the amount of oxide only, and not related to the temperature of preoxidation, except for the fact that higher temperatures required shorter times for development of a given oxide coating.

Referring to the drawings, Fig. 1 is a flow diagram indicating that the glass is prepared by first making it into a fine powder. This glass is ground, preferably by ball milling in porcelain apparatus so that it will pass through 100 mesh screen. If any other form of grinding is employed, wherein the glass comes in contact with metallic surfaces, the resulting metallic contamination should be removed.

The powdered glass so produced is suspended in a liquid which preferably contains some electrolyte. If alcohol is used, the preferred electrolyte is a small proportion, such as .003 gram of lithium nitrate per gram of glass, per 1.19 cc. of alcohol. The electrolyte helps to keep the glass from settling out too rapidly. It will, however, be understood that we do not wish to be restricted to alcohol as the suspending vehicle, as water or other liquid may be substituted. If water is used, other forms of electrolyte may be preferable as compared with lithium nitrate. It may also contain a suspending agent such as clay, gum tragacanth, starch, or the like.

The metal to be coated, in this instance, we are considering the identified alloy as a mere example, is first cleaned by baking in hydrogen according to the factory time-temperature schedule for the size of the piece. It is then roughened, as by pre-oxidation to a predetermined weight per unit surface, or by sand blasting and/or chemical treatment.

If the identified alloy is roughened by oxidation, it has been found that holding at about 900° C. for about three minutes in an electrically heated oven gives good results. However, other time-temperature conditions which give the same weight of oxide on the surface, that is about .0005 to .0007 gram per sq. cm., in accordance with the graph of Fig. 2 may be employed; such as about one minute at about 1000° C. or about fifteen minutes at about 800° C. The minimum amount of oxide for satisfactory adherence, and the desirable "mouse gray" color which indicates it, with the Corning No. 7052 glass which was used, is about .0004 gram per sq. cm.; the maximum is apparently determined by the amount of oxide the glass will absorb, on the one hand, or the point at which the oxide begins to scale off, on the other.

If some other method of metal treatment is employed, such as sand blasting, this may serve as an initial cleaning step and be followed by chemical treatment. The latter, for the identified alloy is desirably obtained by immersion in hot concentrated hydrochloric acid for ten minutes. Microscopic examination has shown that all seals with good adherence have a rough, finely pitted, matte-like surface, and those with poor adherence have definite small flat crystalline faces in the metal surface which appear as dark specks in a microscopic view. The latter condition is also associated with a shiny surface. It will, however, be understood that any treatment resulting in a roughened surface which causes satisfactory glass adherence is within the scope of our invention.

It is considered that a very thin oxide layer, or adsorbed oxygen layer, is necessary for the glass to wet the metal. Consequently, even a surface with proper texture will exhibit poor adherence if fired in a strongly reducing atmosphere, such as hydrogen. On the other hand, good adherence is secured if firing occurs in air or in a neutral atmosphere. In comparing seals produced by proper oxidation, by acid treatment, and by improper oxidation, we have found that in the first two cases the break between the glass coating and the metal, upon bending the latter, occurred in the glass, and in the latter the glass pulled away from the metal. This indicates that the adherence of the glass to the metal for the acid-treated specimens, just as for the properly oxidized ones, was greater than the strength of the glass.

The suspension of glass is applied to the metal surface treated in accordance with one of the aforementioned processes by spraying, dipping or flowing thereon. The thickness of the coating may be up to 1 mm., depending on the purpose for which the coated metal is to be used. Figs. 3 and 4 illustrate a disk 11 of the identified alloy which has been coated with glass 12, applied as a suspension. It will be noted that the entire relatively large flat surface of the disk is not coated, but that the area coated is quite large per unit length, as compared with that of a small wire. This effect may be accomplished by coating the entire surface and, after drying, brushing the undesired glass from the treated metal surface. As an alternative the glass suspension may be applied by using a stencil to keep the portions of the metal which are not to be coated free from the coating material.

The metal after coating is heated in any type of furnace or by induction. This heating may be accomplished in air or a controlled atmosphere. Good results with the identified alloy have been obtained by firing at about 1000° C. for about six minutes. Even if the surface is pre-oxidized, it may be desirable to fire in a neutral atmosphere in order to avoid additional oxidation. The firing causes the particles of glass to fuse together, forming a firmly adherent film over the surface, so the subsequent process, whereby a vacuum tight vessel 13, such as illustrated in Fig. 5, for example, may be built up, involving alternate sections of glass and metal in the present instance, will be successful. The glass dissolves and penetrates the oxide layer to come in contact with the metal. If heating is insufficient or if too much oxide is present, an actual oxide coating may exist which would be apt to cause a leak.

By practicing our method we are able to produce seals, especially those of the large or multiple type, that are strong and vacuum tight, that require less skill on the part of the operator, and that previously have been practically impossible to make because of excessive oxidation during the process of assembly. Shrinkage is decreased because the glass-coated parts always have a controlled oxide coating or a properly roughened interface. Production is increased, since the need of excessive working by the operator of the glass-metal interface during sealing operations is eliminated. By using this invention, some operations that have not been practicable to date, since accurate control was previously not available, as well as normal processes, will now lend themselves to controlled mass production.

Although preferred embodiments of our invention have been disclosed, it will be understood that modifications may be made within the spirit and scope of the appended claims.

We claim:

1. The method of forming an envelope consisting of alternate sections of nickel-cobalt-iron alloy and glass having approximately the same coefficient of expansion, comprising forming flat rings of said alloy, applying a preoxidizing film to said rings amounting to about .0006 gram per square centimeter, coating a relatively large proportion of the area of each flat surface of said rings, inside the edges thereof, with a thin layer of glass of approximately the same coefficient of expansion, and then connecting between adjacent rings, sections of the glass envelope to be formed, said envelope sections abutting the glass covered surfaces of said rings and sealed thereto, leaving metal edges projecting therefrom.

2. The method of forming an envelope comprising constructing flat rings of an alloy of nickel, cobalt, and iron, oxidizing the surface of said rings, coating said rings inside the edges thereof with a layer of glass of approximately the same coefficient of expansion as that of said alloy, and then connecting between adjacent rings sections of a glass envelope to be formed, said envelope sections abutting the glass coated surfaces of said rings and sealed thereto, whereby metal edge portions project from said envelope.

JOSEPH A. PASK.
JOHN E. SCHIVEREE.

REFERENCES CITED

The following references are of record in the file of this patent:

UNITED STATES PATENTS

| Number | Name | Date |
|---|---|---|
| 1,143,885 | Brookfield | June 22, 1915 |
| 1,350,907 | Yanai | Aug. 24, 1920 |
| 1,427,870 | Van Keuren | Sept. 5, 1922 |
| 1,554,703 | Berry | Sept. 22, 1925 |
| 1,893,286 | Iredell | Jan. 3, 1933 |
| 2,043,307 | Scott | June 9, 1936 |
| 2,050,387 | Scott | Aug. 11, 1936 |
| 2,171,234 | Freeman | Aug. 29, 1939 |
| 2,193,640 | Navias | Mar. 12, 1940 |
| 2,219,573 | Fraenckel | Oct. 29, 1940 |
| 2,220,742 | Thorson | Nov. 5, 1940 |
| 2,238,599 | Ramage | Apr. 15, 1941 |
| 2,299,689 | Fruth | Oct. 20, 1942 |

FOREIGN PATENTS

| Number | Country | Date |
|---|---|---|
| 7,508 | Great Britain | 1899 |